(No Model.)

3 Sheets—Sheet 1.

R. J. GATLING.
COTTON THINNER.

No. 603,271.  Patented May 3, 1898.

Witnesses
W. C. Burdine
J. M. Pond

R. J. Gatling,
Inventor
By Dodge & Sons,
Attorneys.

(No Model.) 3 Sheets—Sheet 2.

R. J. GATLING.
COTTON THINNER.

No. 603,271. Patented May 3, 1898.

Witnesses
W. C. Burdine
J. M. Pond

R. J. Gatling,
Inventor,
by Dodge & Sons,
Attorneys.

(No Model.) 3 Sheets—Sheet 3.
R. J. GATLING.
COTTON THINNER.
No. 603,271. Patented May 3, 1898.
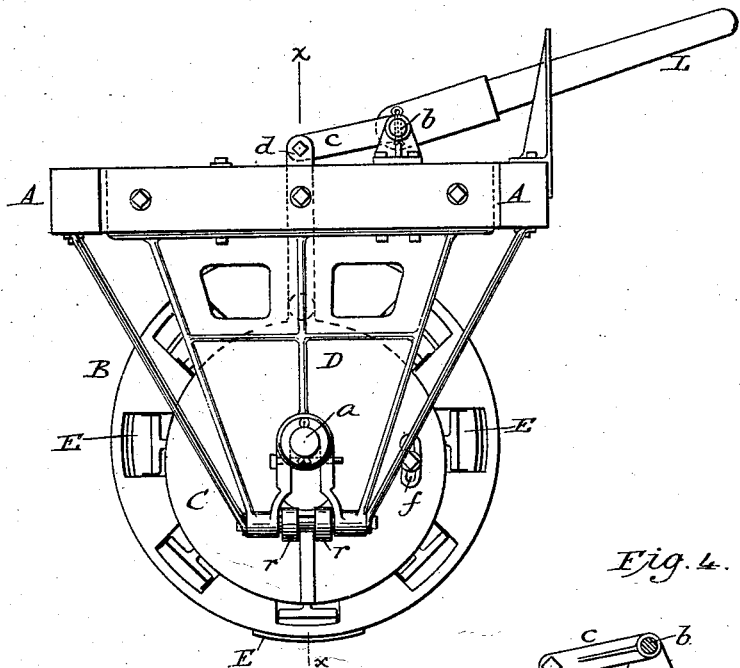
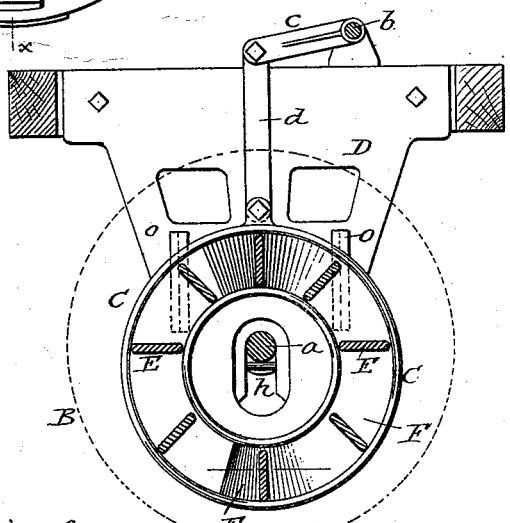
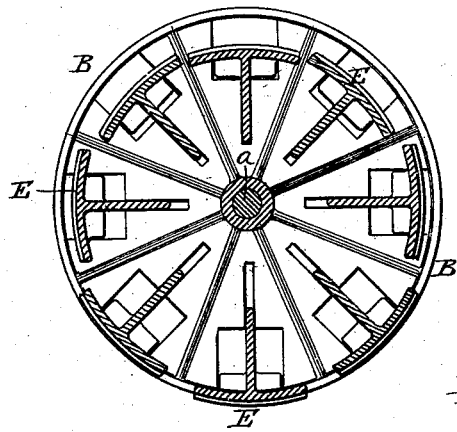
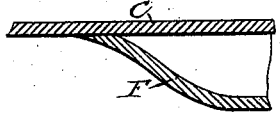
Witnesses
R. J. Gatling,
Inventor
by Dodge & Sons.
Attorneys.

UNITED STATES PATENT OFFICE.

RICHARD J. GATLING, OF NEW YORK, N. Y.

COTTON-THINNER.

SPECIFICATION forming part of Letters Patent No. 603,271, dated May 3, 1898.

Application filed December 18, 1897. Serial No. 662,445. (No model.)

*To all whom it may concern:*

Be it known that I, RICHARD J. GATLING, a citizen of the United States, residing at New York, in the county of New York and State of New York, have invented certain new and useful Improvements in Cotton-Thinners, of which the following is a specification.

My present invention relates to that class of implements known as "cotton-thinners," sometimes called "cotton-choppers," and which are used for cutting out some of the young plants in the rows or drills as planted in the field; and the invention consists in so constructing the machine that the cutters can be raised above the plants while being drawn along, so as to prevent the cutters from operating on the plants when desired, as hereinafter more fully described.

Figure 1:
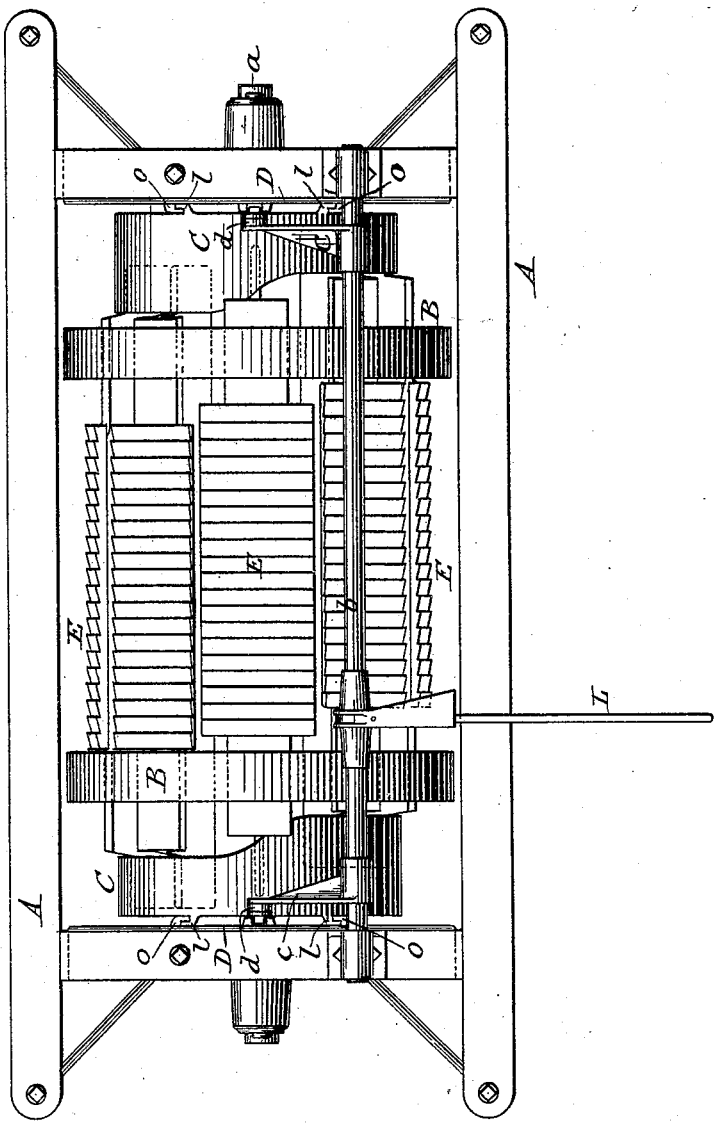
Figure 2:
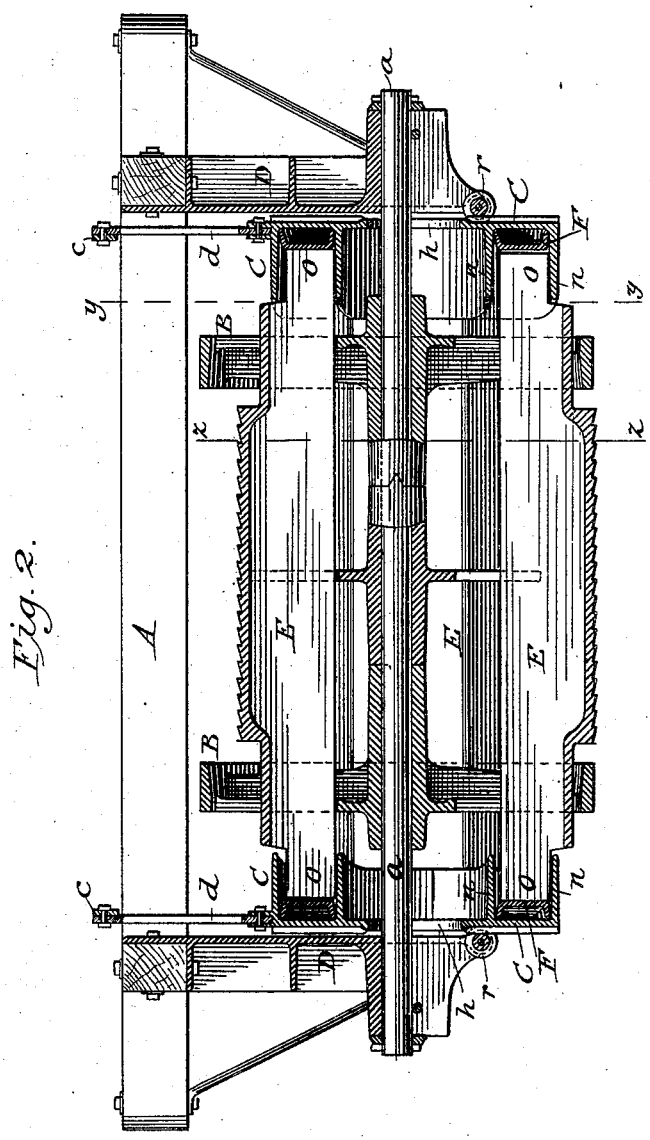

In the accompanying drawings, Figure 1 is a top plan view; Fig. 2, a longitudinal vertical section on the line $x\ x$ of Fig. 3. Fig. 3 is an end elevation. Fig. 4 is a transverse vertical section on the line $y\ y$ of Fig. 2, and Fig. 5 is a similar view on the line $z\ z$ of Fig. 3. Fig. 6 is a sectional plan view of a portion of one of the operating-cams.

This invention is an improvement on the machine for which Patent No. 558,682, dated April 21, 1896, was issued to me. In that machine a series of cutters were mounted loosely in slots in the bearing-wheels and made to reciprocate transversely of the line of movement of the machine by means of stationary cams secured to the frame opposite the ends of the cutters, each cutter as it reached the ground being caused to move endwise and cut out some of the young plants and leaving others standing at intervals equal to the distance between the cutters, but it contained no means by which the cutters could be thrown out of action.

Experience has shown that owing to defective seed or other reasons in some places in a row the plants will stand at such distances from each other that no thinning out is required, and hence the object of this invention is to so construct the machine that the cutters, with their operating-cams, can be raised high enough to pass over the plants at such points and to do this while the machine is moving and without disconnecting the cutters or any of the parts. To accomplish this result, I provide a frame A, as shown in Figs. 1 and 2, in the end brackets D of which is mounted the shaft $a$, upon which are secured the two bearing-wheels B, as shown in Figs. 1 and 2. These wheels, with the cutters E, are constructed the same as in my patent hereinbefore mentioned, with the exception of the slots in which the cutters are mounted and move. In my former patent these slots were only required to be of such a size as would permit a free endwise movement of the cutters; but in my present machine they are made much deeper radially to enable the cutters to be raised vertically in said slots, so that they may pass over the plants when thus raised and not cut them. The form and size of these slots are best shown in Fig. 5. Instead, however, of stationary cams rigidly secured to the frame, as in the former machine, I now provide at each end a disk C, in which I mount the cams F. These disks are provided on their inner faces with two laterally-projecting concentric flanges $n\ n$, the space between them being of the proper width to form a raceway, into which the projecting ends $o$ of the cutters E enter and move as the cutters are carried around by the slotted bearing-wheels B. Within these raceways I mount the circular cams F, as shown in Figs. 2 and 4, one in each disk opposite the ends of the cutters E, whereby the latter are given a reciprocating or to-and-fro movement, the same as in my former patent. In order, however, to vary the time at which the cutters are given their greatest motion in order to effect the cutting of the plants, I make these cams adjustable by means of a curved slot $f$ in the disks C, as shown in Fig. 3, the cam being held in place when adjusted by means of one or more bolts, as there shown. In order to enable these disks, with their cams and the cutters, to be raised, each disk is formed with a vertical slot $h$, Figs. 2 and 4, through which the shaft $a$ passes, so that these parts can be raised independently of the shaft, the bearing-wheels B, and the main frame whenever desired. In order to raise them, I connect each disk C by a rod $d$ to arms $c$, which are rigidly secured to a rock-shaft $b$, mounted on the frame A, and to which there is secured a lever or handle L, as shown in Figs. 1, 2, 3, and 4.

To insure a vertical movement of the disks

C, they are provided on their outer faces with projections or ribs $l$, which engage with fixed guides O, formed on or secured to the inner faces of the end brackets D of the frame, as shown in Fig. 1, these parts being so constructed as to permit of a free vertical movement of the disks and cutters. To render this movement more easy and compensate for any friction which might be created by the endwise thrust or movement of the cutters, I secure to the bottom of the end brackets D two antifriction-rollers $r\ r$, as shown in Figs. 2 and 3, against which the disks bear when moved up or down.

The cutters are of the same style as in my former patent, they being provided both on their face and on their front edge with a series of teeth, as shown in Fig. 1. As the young plants are very tender, these teeth serve to cut or scrape away or mangle and thus destroy the plants with which they come in contact, thus leaving the remaining plants standing at uniform distances apart in the row, as is necessary to enable them to send out side branches instead of growing straight up in a spindling form, as they will if left standing crowded or too thick in the row.

In operation the machine is simply drawn along astraddle of the row, each cutter in turn as it reaches the ground being moved suddenly endwise by the cam, causing it to cut out or remove the plants at that point in the row. Whenever the operator sees that the plants at any point in the row do not need thinning, by simply pressing down the lever or handle L he raises the disks and with them the cutters, so that the latter pass over the plants, leaving them standing. As this thinning out of the plants is done while they are very small, it will be seen that it is only necessary to raise the cutters a few inches.

The advantage of a machine thus constructed is that without stopping and without disconnecting any of its parts and by the mere pressing of a lever the cutters can be thrown out of action at will, whereby it is adapted to the varying conditions of the plants in the row.

It is obvious that this machine can also be used for thinning corn or other plants when planted in drills, as well as cotton, and also to break up old cotton or corn stalks.

Having thus described my invention, what I claim is—

1. In a machine for thinning plants, the combination of the rotatable wheels B having a series of cutters mounted loosely therein, disks engaging the projecting ends of said cutters with cams for operating the same, and means for raising the disks and cutters, substantially as and for the purpose set forth.

2. In combination with the movable disks, the cams F with means for adjusting the same, substantially as shown and described.

3. In a plant-thinning machine, the wheels B provided with slots adapted to permit a longitudinal and also a radial movement of cutters mounted therein, with means substantially such as shown and described for moving the cutters both longitudinally and radially in the slots of said wheels while in motion, as set forth.

4. In combination with the vertically-movable disks arranged to engage the ends of the cutters, the antifriction-rollers $r$, $r$, arranged to operate substantially as described.

5. In combination with the main frame and the vertically-movable disks, ribs or guides arranged to prevent lateral movement of the disks as set forth.

6. The combination in a plant-thinning machine, of the slotted wheels B, the cutters E mounted therein, the movable disks C provided with an annular recess to engage the ends of the cutters with cams located in said recesses, the rock-shaft $b$ provided with a lever L, and arms $c$ with rods $d$ connecting said arms and disks, all constructed and arranged to operate substantially as herein described.

In witness whereof I hereunto set my hand in the presence of two witnesses.

RICHARD J. GATLING.

Witnesses:
CARROLL SPRIGS,
H. Y. CUMMINS.